(No Model.)
W. J. SLYDER.
UMBRELLA HOLDER.
No. 541,951. Patented July 2, 1895.
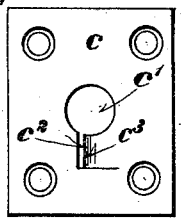
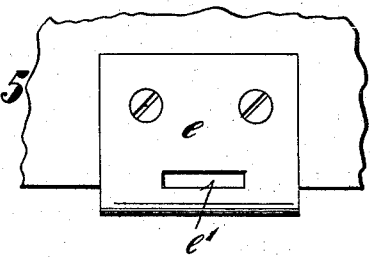
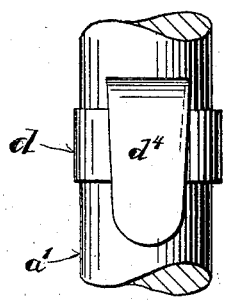
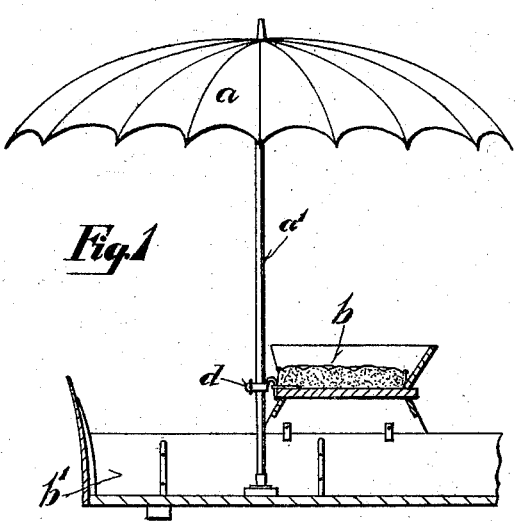
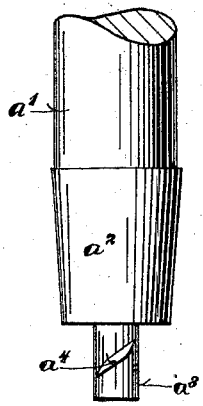
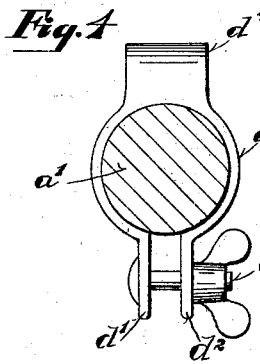
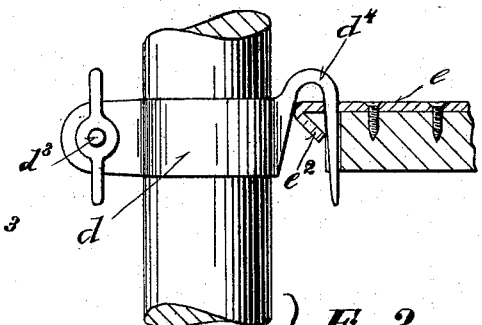
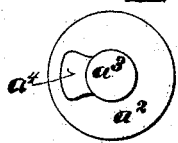
WITNESSES:
F. B. Ernest
Frank Ibatt
INVENTOR
Wm. J. Slyder
BY
Staley and Hopkins
ATTORNEYS

UNITED STATES PATENT OFFICE.

WILLIAM J. SLYDER, OF TROY, OHIO, ASSIGNOR TO TROY CARRIAGE SUN SHADE CO., OF SAME PLACE.

UMBRELLA-HOLDER.

SPECIFICATION forming part of Letters Patent No. 541,951, dated July 2, 1895.

Application filed September 21, 1893. Serial No. 486,107. (No model.)

*To all whom it may concern:*

Be it known that I, WILLIAM J. SLYDER, a citizen of the United States, residing at Troy, in the county of Miami and State of Ohio, have invented certain new and useful Improvements in Umbrella-Holders, of which the following is a specification.

My invention relates to improvements in fastening devices for umbrellas or sun shades, and the object of my invention is to provide simple fastening devices by which an umbrella or shade can be readily attached to a vehicle and be supported above the seat thereon so as to protect the occupants therein. I attain these objects by the constructions shown in the accompanying drawings, in which—

Figure 1 is a side elevation of my improved device, showing a portion of the vehicle in section. Fig. 2 is an enlarged view of the ends of the same, some of the parts being shown in section. Figs. 3 to 9, inclusive, are detail views of some of the respective parts hereinafter referred to.

Like parts are represented by similar letters of reference in the several views.

In the said drawings, $a$ represents an umbrella, such as employed for vehicles and which may be of any desired and usual construction.

$b$ is the vehicle seat, and $b'$ the bed or body of the vehicle.

The umbrella is provided with a central stand or support $a'$, which is preferably formed circular in cross section, in the usual manner. This central standard is provided at its lower end with a ferrule $a^2$, which has at the bottom a downwardly projecting stud $a^3$, formed at one side with a projecting lug $a^4$, arranged at an angle thereto in the nature of a screw-flange. In connection with this ferrule and projection, I employ a plate $c$, having a central perforation $c'$, adapted to fit over the stud $a^3$, and having a lateral opening $c^2$, which extends from said perforation; said opening being formed by shearing the metal of said plate $c$ and bending it downwardly to form a projecting lip $c^3$, which projects below the bottom of said plate and adjacent to the opening $c^2$ and at an angle to said plate. Arranged on the standard $a'$, above the ferrule $a^2$, is an open clamping collar $d$, having projecting ears $d'$ $d^2$, through which extends a thumb-nut $d^3$, by which the said collar may be clamped to said plate. This collar is provided with a hook-shaped projection $d^4$, adapted to engage in a slotted opening $e'$, formed in a plate $e$. The hook-shaped projection $d^4$ is formed with its respective sides slightly tapered, so that as it is forced downwardly into the slot $e'$ the sides contact with the said plate and hold the same against any lateral movement therein; the plate $e$ having one side thereof adjacent to the slot $e'$ bent downwardly to form an auxiliary support and bearing $e^2$, to insure this result.

In operation the plate $e$ is secured to the seat $b$ of the vehicle, and the plate $c$ secured to the bottom of the body thereof. The hook-shaped portion of the clamping collar $d$ is placed in the slotted opening of the plate $e$, with the projecting stud $a^3$, resting in the opening $c'$ of the plate $c$. The standard $a'$ is then turned until the angularly arranged flange $a^4$ on said projection engages with the opening $c^2$, which thus draws said parts firmly together; the downwardly projecting lip contacting with said flange and preventing the standard from being turned more than a portion of a revolution in said plate. When in this position the clamping collar $d$ is forced downwardly on the standard $a'$, which brings the beveled portions thereof in contact with the parts of the plate $e$, after which the collar is clamped firmly on said standard by the thumb-screw $d^3$. The engagement of the downwardly projecting lip $c^3$ and the flange $a^4$ causes the ferrule to be drawn tightly against the plate $c$, so that all lost motion between the parts is taken up and thus prevents any rattle or shaking of the parts with reference to each other.

It will be seen that by the above description I provide a device which is at once simple and at the same time very effective in operation. To detach the parts it is only necessary to loosen the clamp $d$, after which the standard is turned therein until the flange $a^4$ strikes the opposite side of the projection $c^2$, which acts in the nature of a screw-flange to bring the stud out of the opening $c'$. It will be seen that it matters not in which position the stud is inserted into the opening. By turning it in one direction it will be drawn through said plate and by turning it in the opposite direction it will be removed therefrom.

Having thus described my invention, I claim—

1. In a fastening device for umbrellas, the combination with the standard, of a clamping collar having a hook-shaped projecting portion with beveled sides, as described, a plate having an opening adapted to be engaged by said hook-shaped portion, said plate being provided with a downwardly-extending projection to form an auxiliary bearing surface, substantially as specified.

2. The combination with an umbrella standard, of an open clamping collar having a clamping screw as described, and a hook-shaped projection formed integral with said collar and provided with beveled sides as described, a supporting plate provided with an opening adapted to be engaged by said hook-shaped projection, and means, as described, for detachably securing the lower end of said standard, substantially as specified.

In testimony whereof I have hereunto set my hand this 5th day of September, A. D. 1893.

W. J. SLYDER.

Witnesses:
H. F. DOUGLASS,
E. C. BROWN.